(12) United States Patent
Lin et al.

(10) Patent No.: US 9,703,921 B1
(45) Date of Patent: Jul. 11, 2017

(54) NATURALLY CONNECTING MIXED-SIGNAL POWER NETWORKS IN MIXED-SIGNAL SIMULATIONS

(71) Applicant: Cadence Design Systems, Inc., San Jose, CA (US)

(72) Inventors: Qingyu Lin, San Jose, CA (US); Nan Zhang, Beijing (CN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 48 days.

(21) Appl. No.: 14/794,558

(22) Filed: Jul. 8, 2015

(51) Int. Cl.
*G06F 17/00* (2006.01)
*G06F 17/50* (2006.01)

(52) U.S. Cl.
CPC ...... *G06F 17/5081* (2013.01); *G06F 17/5009* (2013.01); *G06F 17/5045* (2013.01)

(58) Field of Classification Search
USPC ........................................................ 716/109
See application file for complete search history.

(56) References Cited

U.S. PATENT DOCUMENTS

| | | | | |
|---|---|---|---|---|
| 2003/0154061 A1* | 8/2003 | Willis | ................. | G06F 17/5036 703/4 |
| 2011/0054875 A1* | 3/2011 | Chang | ................. | G06F 17/5036 703/14 |
| 2011/0083114 A1* | 4/2011 | Chetput | ................. | G06F 17/5022 716/106 |
| 2011/0161900 A1* | 6/2011 | Ginetti | ................. | G06F 17/5022 716/106 |
| 2012/0198411 A1* | 8/2012 | Bhushan | ................. | G06F 17/5036 716/139 |

* cited by examiner

*Primary Examiner* — Mohammed Alam
(74) *Attorney, Agent, or Firm* — Andrews Kurth Kenyon LLP (57) ABSTRACT

A system, method, and computer program product for determining whether a design for a circuit meets design specifications, to facilitate the provision of a manufacturable description of the circuit. A computer-operated circuit simulation tool reads the design for the circuit and a power specification, and selectively internally creates a network connection and inserts a corresponding connect module in the design, for at least one circuit block having an unsupported signal declared in the power specification. Typically such a circuit block will be an analog block, whether an original analog block or an analog representation of a digital block, and may involve electrical or wreal signal interactions. The simulation tool performs a mixed-signal simulation of the design. Embodiments tangibly output a verification determination from a comparison of the simulated design performance results and the design specifications in order to provide the manufacturable description of the circuit.

20 Claims, 11 Drawing Sheets

NATURALLY CONNECTING MIXED-SIGNAL POWER NETWORKS IN MIXED-SIGNAL SIMULATIONS

CROSS-REFERENCE TO RELATED APPLICATIONS

This application is related to commonly-assigned U.S. patent application Ser. No. 13/523,492, filed on Jun. 14, 2012 and issued as U.S. Pat. No. 9,020,797 on Apr. 28, 2015. This related application and patent are hereby incorporated by reference in their entireties.

FIELD OF THE DISCLOSURE

This description relates to the field of integrated circuit design and testing, including circuit simulation and verification, and more precisely to improving coordination of power specifications and power domain interconnections in mixed-signal circuit designs.

BACKGROUND

When the electronic design automation (EDA) industry began creating standards for specifying and simulating digital electronic circuits, power management was relatively simple because most integrated circuit (IC) blocks operated on a single supply voltage. Hardware description languages thus provided no power management capabilities. Later designs used clock gating controls and multiple level-shifted supply voltages for different circuit blocks for basic power strategies. Different power domains could be simulated and verified with some largely straightforward extensions to the digital design methodology. In this description, a power domain is a collection of circuit elements that are typically powered in the same way, placed together in a physical circuit implementation, and powered by the same power rails.

Power management is however becoming increasingly important for meeting critical design constraints as integrated circuit designs increase in complexity and as battery-powered consumer devices dominate the marketplace. New design techniques have been developed to manage both static and dynamic power consumption. For example, back-bias control methods that raise transistor voltage thresholds and reduce leakage currents are now common.

These new techniques generally involve various new circuit components specifically for power-related circuit behavior. For example, power controllers and isolation cells may logically and/or electrically isolate a shut-down power domain from powered-up power domains. Level shifters may translate signal voltages from one power domain to another. Retention registers may store data to facilitate fast transitions from a power-off state to a power-on state. Power management logic may control the states and voltages of the supplies provided to the supply network, and may control the states of power switches that are part of the supply network.

Power-aware circuitry is therefore becoming more complex and difficult to manage. Designers are thus increasingly incorporating power awareness into designs as early in the design process as possible by consolidating the desired "power intent" or power management constraints for a circuit design into a single power specification. Design tool vendors have therefore adopted a standardized power specification format called Unified Power Format (UPF) that defines the syntax and semantics used to express power intent in power-aware electronic design tools. UPF is the popular name of the Institute of Electrical and Electronics Engineers (IEEE) 1801 standard; in both this description and colloquially in the design community, the IEEE1801 standard is synonymously referred to as UPF. (UPF is an exemplary but non-limiting power specification format; the Common Power Format (CPF) for example is also known to those of ordinary skill in the circuit design art.)

A UPF specification may generally define how to create a supply network to supply power to each circuit block, how the individual supply nets behave with respect to each other, and how logic functionality is extended to support dynamic power switching. A UPF specification may for example describe the voltage level shifting, driver or receiver isolation, power or ground switching, and state retention insertion constraints that are required for low power operation. UPF enables portability of power intent across a variety of commercial design tools throughout an entire design, analysis, and verification flow. UPF also defines the relationship between the power intent captured in its format and design intent captured via other formats (e.g., standard cell libraries).

While UPF has greatly aided power-aware digital design, challenges remain for applying UPF concepts to mixed-signal designs, which are among the fastest growing market segments in the electronics and semiconductor industry. Most system-on-chip designs today are mixed-signal, with more complex analog circuit blocks becoming more popular and also increasingly containing digital control logic. Adding power management to a mixed-signal design involves analyzing the design to determine which power supplies provide power to each logic element, and if drivers and receivers are in different power domains, inserting power-management cells as required to ensure that neither logical nor electrical problems result if the two power domains are in different power states. Mixed-signal circuit designers thus require verification methodologies that can accurately validate the interfaces and interactions between analog and digital domains.

Mixed-signal power-aware circuit design verification is additionally challenging because it may encompass both analog and digital circuit blocks described at different levels of abstraction. Circuit blocks may for example be represented in schematics, SPICE netlists, analog behavioral models, or via purely digital models described in various widely-used design languages. Digital circuit blocks may even be replaced with analog circuit block representations for increased simulation accuracy in some cases. Such replacement is becoming more common to better describe the actual electrical dynamics of power supply networks than is possible with simple fixed-value supplies.

Proper verification of modern power-aware mixed-signal circuits therefore demands not only coordinated simulation of both analog and digital circuit blocks in various representations, but also intuitive coordination of different power domains across an entire design hierarchy. A need thus exists for more fully dynamic interoperation between analog and digital circuit blocks in mixed-signal simulations involving multiple power domains. Accordingly, the inventors have developed a novel way to help circuit designers and design tool vendors more reliably design and dynamically test the operation of such ICs.

DETAILED DESCRIPTION

This description presents a system, method, and computer program product for improving coordination of power specifications and power domain interconnections in mixed-signal circuit design simulation and verification. Circuit designs surviving the design and verification process may then be translated into manufacturable descriptions of circuits, ultimately for physical fabrication of those circuits. The embodiments described thus advance the circuit design art by enabling a greater level of verification of mixed-signal integrated circuit designs prior to such fabrication.

This description provides an extension to connect module insertion mechanisms such that they operate on not only those signals and ports declared in a designer's hardware design language (HDL) code, but also on unsupported signals declared in a power specification, such as an exemplary and non-limiting UPF specification. The embodiments enable power-aware mixed-signal simulation and verification without requiring a user to manually insert such signals into the circuit design to replicate the information in the UPF specification. The embodiments also enable a convenient method of connecting power in cases where the standard IEEE1801 specification is not complete, by providing a set of rules to complete the connections under such situations.

Figure 1:
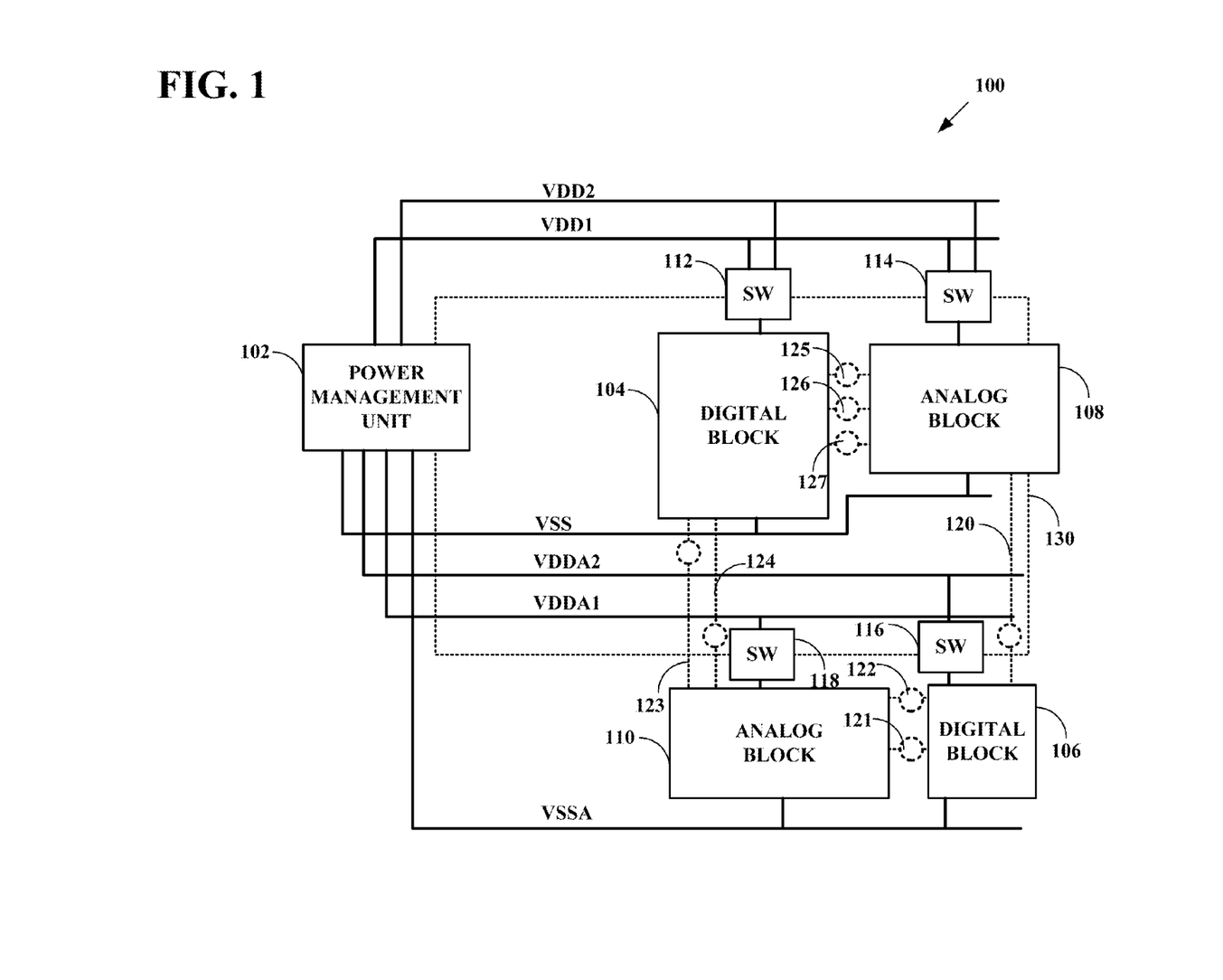
FIG. 1 is a diagram of a power-aware mixed-signal circuit design 100, according to an embodiment.

FIG. 1 shows a diagram of a power-aware mixed-signal circuit design 100, according to an embodiment. Design 100 may be stored in a computer-readable storage medium. This exemplary and non-limiting system may comprise a power management unit (PMU) 102 that may generate various supply voltages to components. For example, VDD1, VDD2, VDDA1, and VDDA2 may comprise positive voltages, while VSS and VSSA may comprise negative voltages, with each distributed via different power rails. The supply voltages and their distribution networks may be described in a UPF specification (also referred to herein as an IEEE1801 standard specification) or other recognized power specification such as CPF, which may comprise a text file (not shown) that may also be stored in a computer-readable storage medium for access by computer-operated circuit simulation tools.

Two exemplary digital circuit blocks 104 and 106 are provided, along with two exemplary analog circuit blocks 108 and 110. These circuit blocks and their various ports and connections may be described in any known format or design language. An integrated circuit design to be simulated and verified may comprise blocks that are for example described by a Register Transfer Level (RTL) description or a gate-level netlist. The gate-level netlist may be synthesized from an RTL source, including a hardware description language (HDL) such as Verilog or VHDL. Both RTL and gate-level netlists are descriptions of the circuit design's components and the electrical interconnections between the components. It is possible that different representations of a given circuit block may be used for different purposes. For example, a digital block may be modeled in a digital hardware design language in some simulations, but may be replaced with an analog block if more precise but typically slower analog simulation is needed. Cell libraries may also provide circuit blocks in multiple different description types for compatible use with particular simulation and verification tools.

Four exemplary power switches 112, 114, 116, and 118 are also provided. Each power switch may selectively connect a particular supply voltage to a component, typically in response to control signals (not shown). For example, power switch 112 may selectively connect either voltage VDD1 or voltage VDD2 to its output port for delivery to digital block 104. The selection of different supply voltages is widely used by circuit designers for different purposes, including activating or deactivating circuit blocks entirely, or enabling various power states that may be designed to control computation or communication speed or to extend battery lifetime, etc. Components may also be connected directly to a supply rail. Various ground lines, not shown, may be similarly connected directly or through power switches.

A number of exemplary power-aware signal paths 120-127 are also provided between the various circuit blocks. These paths may enable communication between the various circuit blocks across interfaces that may require voltage level-shifting, isolation, and storage of state information. The interfaces may span circuit blocks of different types (e.g., digital blocks and analog blocks) and/or different representations. Mixed-signal simulation may involve both event-driven simulation of digital circuit block representations and continuous-time simulation of analog circuit block representations. Each element in an analog circuit block may immediately influence any other connected circuit block element, thus analog simulation is typically more complex and time-consuming but potentially more accurate than digital simulation.

Exemplary power-aware mixed-signal circuit design 100 thus provides both power-aware signal paths and (power-aware supply networks according to the power intent of the circuit designer. The designer has complete freedom to incorporate analog blocks and digital blocks into the design, and may rely on a mixed-signal circuit simulation tool to manage the digital simulators and the analog simulators that may be needed. The designer may also rely on the exemplary UPF specification to describe the power supply nets and related constraints and interactions for those signals that are supported by the different simulators that may be needed. Power management mediates the changing power states of power domains in the system and the interactions between power domains that are in different states at various times. For example, a power domain may be defined in the UPF specification to include the components within power domain boundary 130, which may all be power-managed together. Thus, the overall system 100 may be considered to comprise a circuit design portion comprising circuit blocks (termed the "HDL" portion in this description and in the design community, as it historically comprised mostly digital blocks) and interconnections and a "UPF" portion comprising power supply networks and interconnections.

Complete support of all the different representational combinations is not currently available for full-chip verification of hierarchical mixed-signal power-aware designs. At present, a designer may describe the circuit design's power network connection via a UPF or other specification, but may then be required to manually connect a design port to a supply net or port in the UPF specification. Manual converter insertion is a slow, tedious, and error-prone process. This requirement is thus a major restriction on the design community, and highlights the need for design flexibility for mixed-signal simulation practice. For example, a given block may be switched between various different representations for different purposes, and there may be various different port types according to the particular design configuration. Manual modification of designs to enable power-aware mixed-signal simulation and verification is not a viable long-term option for the design community.

Figure 2:
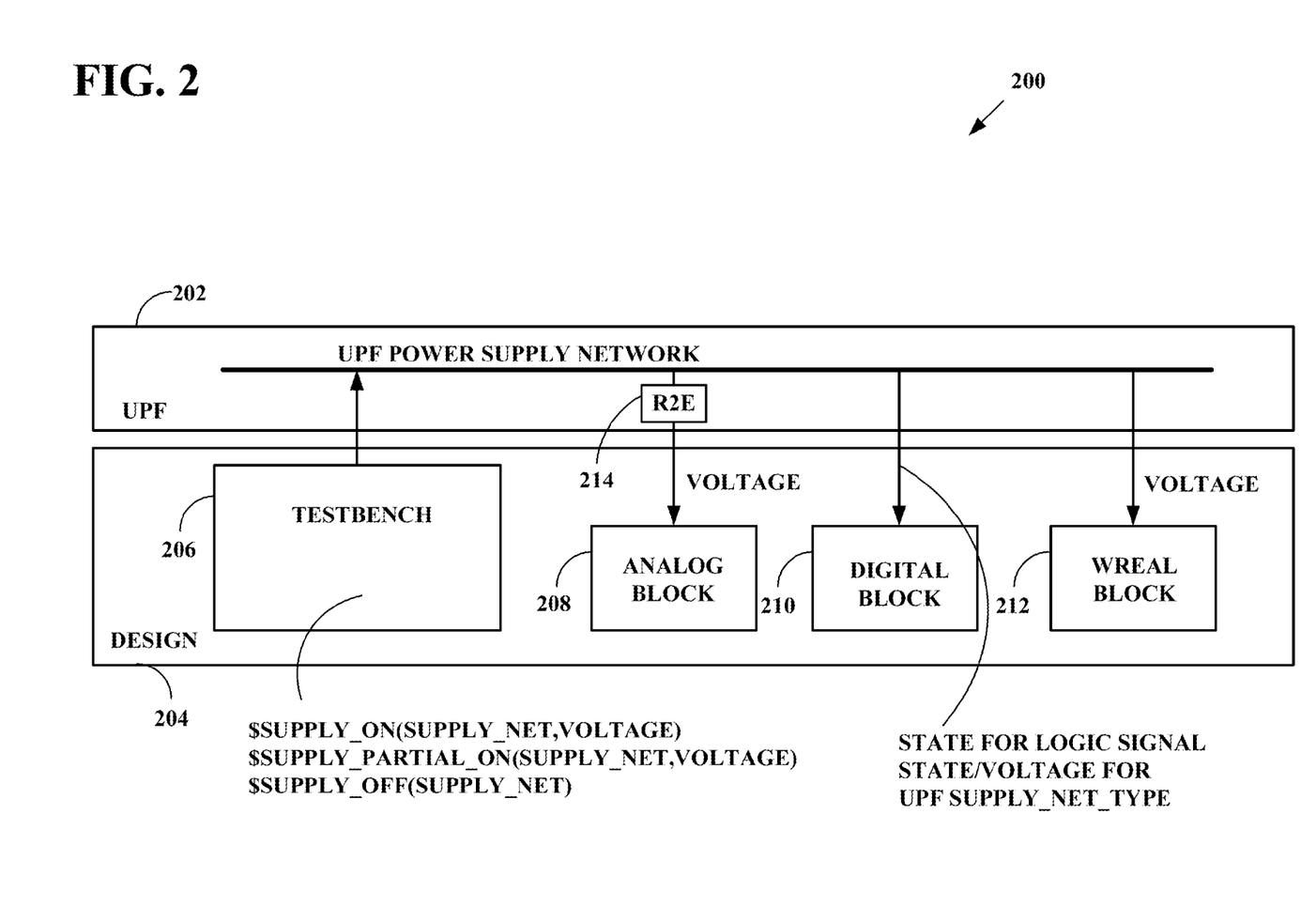
FIG. 2 is a diagram of a UPF-specified power-managed system 200, according to an embodiment.

FIG. 2 shows a diagram of a UPF-specified power-managed system 200, according to an embodiment. The UPF portion 202 may for example comprise a UPF power supply network as defined by a UPF specification for managing power connections and constraints for the design portion 204. In this example, the design portion 204 may comprise a testbench 206, an analog block 208, a digital block 210, and a wreal block 212 ("wreal" stands for "wire-real"). The testbench 206 may define a supply net capable of delivering different voltage values to the UPF power supply network. Digital block 210 may receive a voltage value from the UPF power supply network in the form of a logic signal state (e.g., high or low), a signal type that it is designed to receive.

Analog block 208 may require an electrical voltage representation to operate in an analog simulator. In one embodiment, the UPF power supply network may therefore transmit a voltage value to a real-to-electrical (R2E) converter 214 that is inserted in the design. The R2E converter 214 is a type of connect module that may receive a real-valued numerical voltage and output an electrical voltage value compatible for use by an analog simulator.

Thus, in one embodiment, a computer-operated circuit simulation tool may read the design portion 204 and a power specification defining the UPF portion 202, selectively internally create a network connection, and insert a corresponding connect module in the design based on the UPF specification. In this case, the corresponding connect module is the R2E converter 214. The tool may then perform a mixed-signal simulation of the design. The tool or another application may then compare the simulated design performance results and the design specifications to determine if proper operation has been verified, and output the determination.

In general, a connect module acts during simulation to transform discrete domain information used by a digital design instance to the continuous domain used by an analog design instance, or vice-versa. Connect modules are a particular form of mixed-signal module that typically allow accurate modeling of the interfaces between analog blocks and digital blocks. Connect modules may help ensure the drivers and receivers to which they are connected are correctly handled, so the simulation results are not impacted.

In this instance, an analog simulator may access a value of the digital internal instantaneous supply voltage from the UPF power supply network using the R2E converter 214, and produce a virtual instantaneous supply voltage that is consistent with the digital instantaneous supply voltage. Thus the analog simulator is effectively able to "see" the UPF power supply network voltage in a compatible representation and use it. That is, the virtual supply voltage will be simulated by an analog simulator and will yield the same characteristics for the analog block 208 as would be the case if the analog block 208 had a digital representation and its power supply was specified using UPF.

Different simulators and simulator languages may support different data representations. Verilog-AMS for example supports the "electrical" simulation discipline and the "wreal" data type. (In this description a "discipline" is a user-defined type for declaring a net, characterized by the defined natures for potential and flow.) Verilog for example defines "real" data type variables. The electrical, real, and wreal representations all provide a continuous value that may be used to describe the behavior of an object that is analog in nature. The electrical representation is used to describe the characteristics of a conservative system. However, a simulation using real variables does not necessarily use a continuous-time solver. A real-valued variable simply acts as a state bearing object, like a declared variable in a C program.

Wreal modeling is a behavioral modeling technique that may simulate the functions of analog blocks within a larger predominantly digital simulation. Rather than limiting the data that may be carried by wires within a simulation to a small set of binary states, wreal modeling enables simulators to transfer real values on input and output ports. The simulation may thus provide analog-like characteristics for modules designed to interpret those values.

The wreal net type represents a real value bearing net that is however simulated by an event driven solver. That is, the computation of values is triggered by a change in a wreal value beyond a given tolerance. A resulting pseudo-continuous simulation thus runs much faster than a purely continuous simulation using electrical values, and is more accurate than digital simulation. While this approach falls short of true electrical modeling of both the current and voltage on each port, it is of great practical use since most ports transfer either a voltage or a current. Wreal block 212 is thus able to process the voltage from the UPF power supply network directly.

Figure 3:
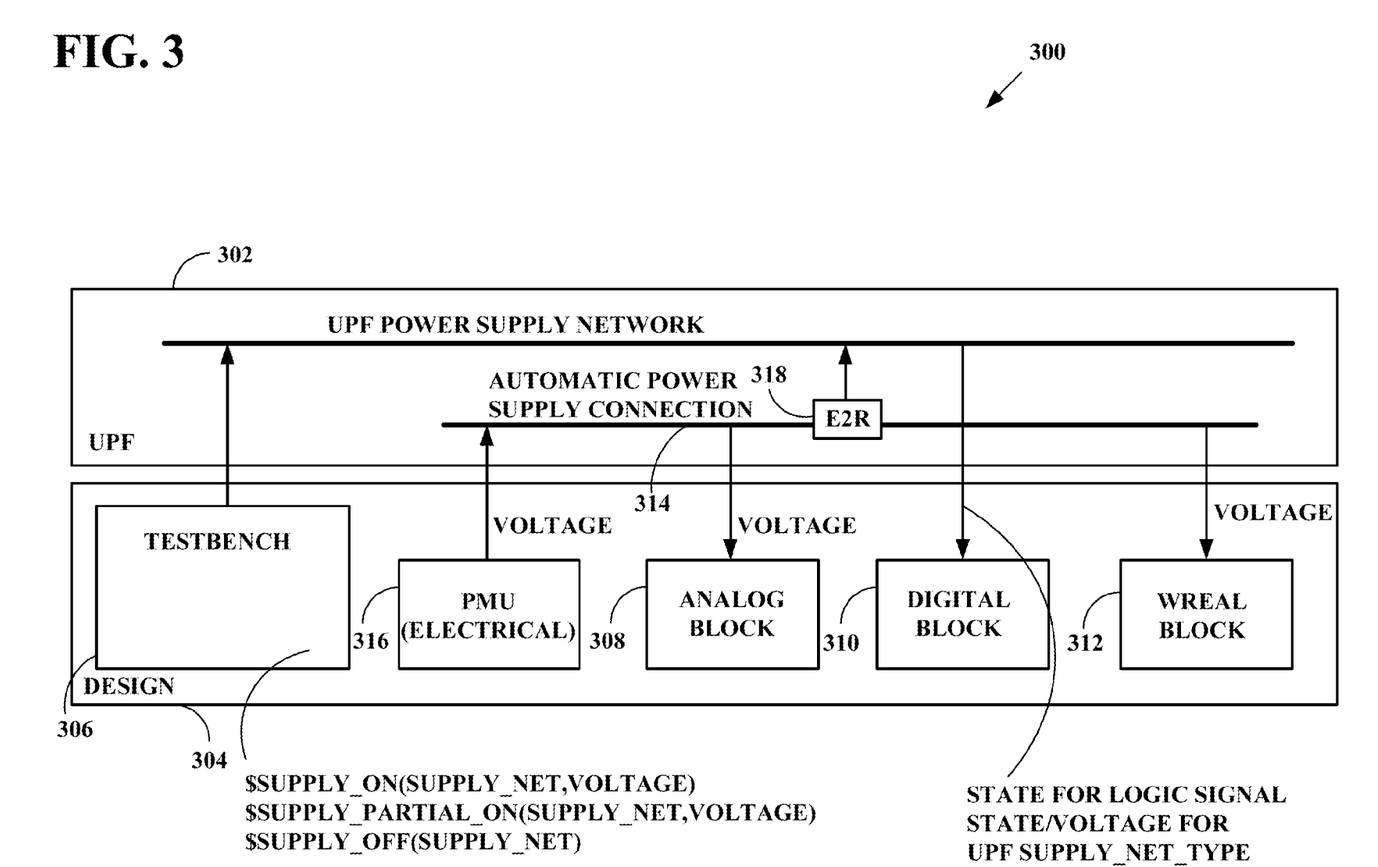
FIG. 3 is a diagram of a UPF-specified power-managed system 300, according to an embodiment.

FIG. 3 shows a diagram of a UPF-specified power-managed system 300, according to an embodiment. The UPF portion 302 may for example comprise a UPF power supply network as defined by a UPF specification for managing power connections and constraints for the design portion 304. In this example, the design portion 304 may comprise a testbench 306, an analog block 308, a digital block 310, a wreal block 312, and a PMU 316. The testbench 306 may define a supply net capable of delivering different voltage values to the UPF power supply network.

Exemplary PMU 316 provides a voltage in an electrical representation. This scenario may arise when the PMU 316 is defined inside an analog block. Both the analog block 308 and the wreal block 312 are capable of accepting supply voltages in an electrical representation, so an embodiment may provide a power supply connection 314 for interconnecting the PMU 316, the analog block 308, and the wreal block 312, based on the UPF specification. The embodiment may also provide an electrical-to-real (E2R) converter 316 in the UPF portion 302. The UPF power supply network may therefore "read" the electrical voltage provided by PMU 316. Digital block 310 is capable of accepting supply voltages from the UPF power supply network without conversion.

Note that in this example the electrical voltage representation from the PMU 316 is transferred via the E2R converter 318 to the UPF power supply network and then to digital block 310. Changes to the electrical voltage representation from the PMU 316 therefore propagate to the UPF portion 302 and to the digital block 310 in a compatible form based on the UPF specification. The behavior of digital block 310 may therefore be more precisely modeled than in the case where its provided supply voltage is entirely static.

Figure 4:
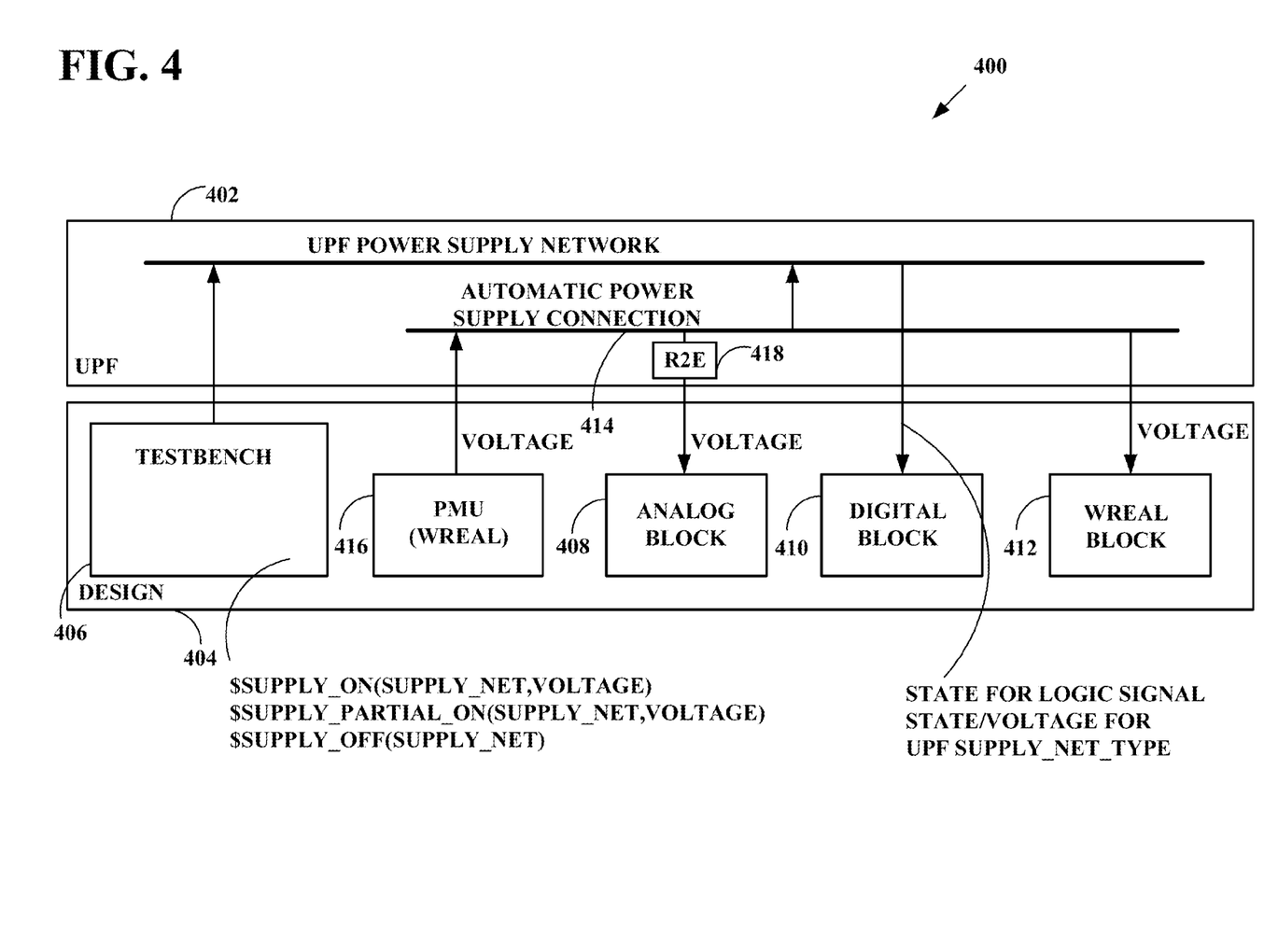
FIG. 4 is a diagram of a UPF-specified power-managed system 400, according to an embodiment.

FIG. 4 shows a diagram of a UPF-specified power-managed system 400, according to an embodiment. The UPF portion 402 may for example comprise a UPF power supply network as defined by a UPF specification for managing power connections and constraints for the design portion 404. In this example, the design portion 404 may comprise a testbench 406, an analog block 408, a digital block 410, a wreal block 412, and a PMU 416. The testbench 406 may define a supply net capable of delivering different voltage values to the UPF power supply network.

Exemplary PMU 416 provides a voltage in a wreal representation. The wreal block 412 is capable of accepting supply voltages in a wreal representation, so an embodiment may provide a power supply connection 414 for interconnecting the PMU 416 and the wreal block 412, based on the UPF specification. The embodiment may also provide a real-to-electrical (R2E) converter 418 in the UPF portion 402. The analog block 408 may therefore "read" the wreal voltage provided by PMU 416 following conversion, and process it in a continuous-time simulation though it was originally intended for event driven simulation.

An embodiment may transfer the wreal voltage on the power supply connection 414 to the UPF power supply network, based on the UPF specification. That is, the UPF specification may comprise a conversion table for determining how wreal voltage representations may correspond to different logic states. Digital block 410 is capable of accepting logic state voltages from the UPF power supply network without conversion.

Figure 5:
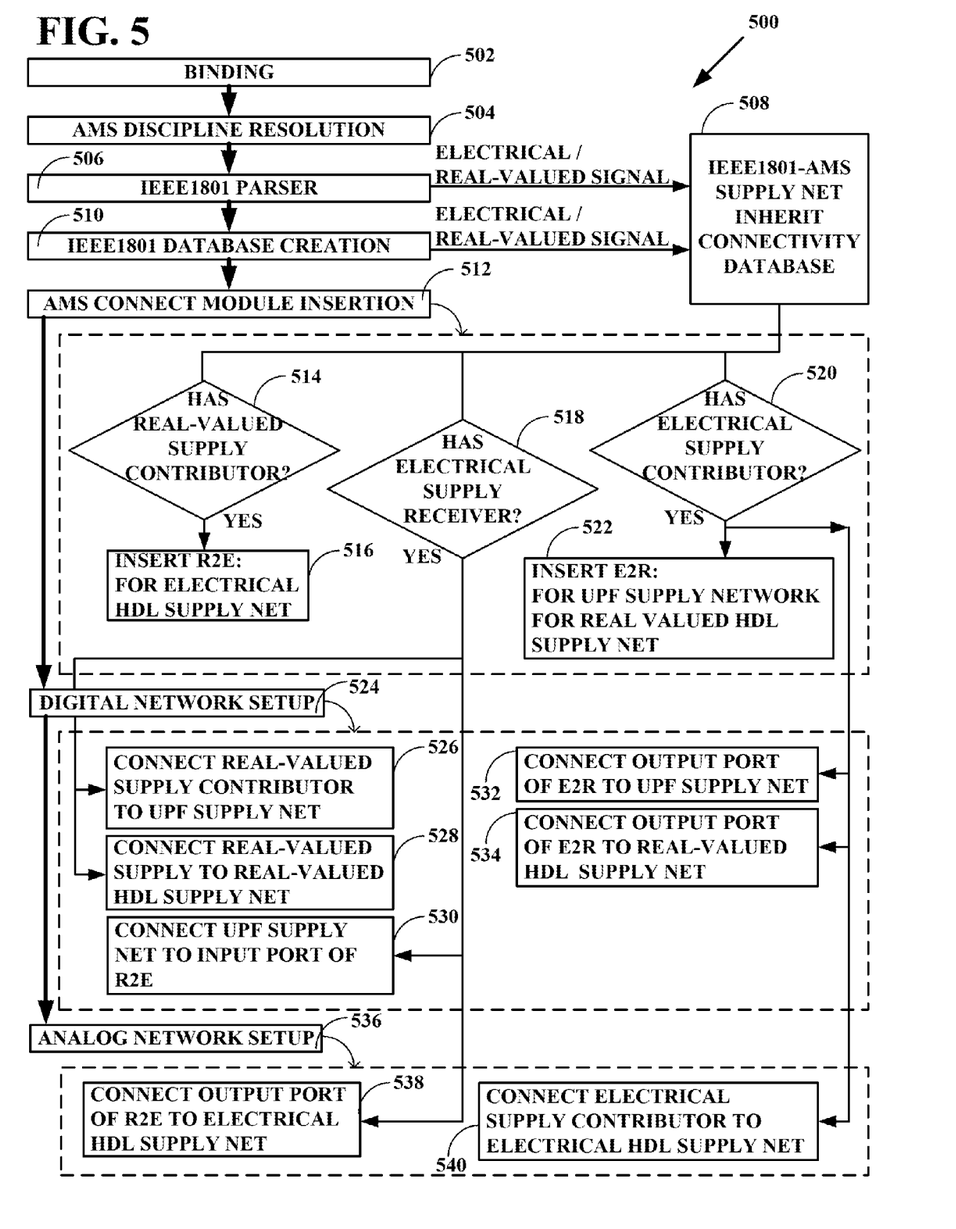
FIG. 5 is a diagram of a power-aware mixed-signal interoperation methodology 500, according to an embodiment.

FIG. 5 shows a diagram of a power-aware mixed-signal interoperation methodology 500, according to an embodiment. Note that in some of the examples above, embodiments may connect, without manual intervention, supply sources in a given representation to blocks designed to receive that representation. In other examples, embodiments may connect, without manual intervention, supply sources in a given representation to blocks that are not designed to receive that representation but are nonetheless capable of receiving that representation based on the UPF specification. That is, event driven representations may generally be received by a block intended for continuous time simulation without difficulty, and a block designed to receive a logic state may handle a more dynamic voltage representation if the UPF specification enables it via a conversion table. However, in some cases the embodiments may, without manual intervention, internally create a network connection and insert a corresponding connect module in the design, to enable proper exchange of signal representations to carry out the power intent described in the UPF specification.

FIG. 5 summarizes the selective creation of a network connection and a corresponding connect module in the design. In this figure, the design may be described as comprising a UPF supply net and an HDL supply net, where the latter term refers to the non-UPF portion of the design comprising circuit blocks (which were historically digital).

At 502, an analog/mixed-signal (AMS) simulator may process a hierarchical circuit design by performing global, cell, and instance binding for libraries and views. That is, library binding may determine from which library a given cell or block is obtained, and view binding may determine which representation of a given cell or block is to be used. A designer may override global and cell binding for a particular instance in a design.

At 504, the simulator may resolve the different disciplines in the design, to identify connectivity between different representational domains. Circuit blocks are connected by nets, so the simulator may determine the signal types associated with the nets connecting various blocks during a process known as elaboration. The elaboration process determines, for each circuit block, signals that correspond to the nets and ports of the block. At 506, an IEEE1801 parser may read and process the UPF specification, to for example perform syntax and semantic checking, preserve parameter values, and store UPF data in a parse tree. The various electrical and real-valued signals found may be copied into an IEEE1801-AMS supply net inherit connectivity database 508. At 510, an IEEE1801 database may be created by for example compiling RTL describing a design. The various electrical and real-valued signals found thereby may be copied into the database 508.

At 512, the analog/mixed-signal simulator may carry out a process for inserting connect modules, using information stored in the database 508. The simulator may determine whether each instance in the design has a real-valued representation supply contributor, such as a signal source in the HDL supply net portion of the design, at 514. If so, then embodiments may insert a real-to-electrical converter for the electrical HDL (e.g., non-UPF) supply net. This is the scenario shown previously in FIG. 2, wherein real-to-electrical converter 214 is connected to analog block 208.

At 518, the simulator may determine whether each instance in the design has an associated electrical representation supply receiver. If so, the instance will be processed further later on, as will be described.

At 520, the simulator may determine whether each instance in the design has an electrical representation supply contributor, such as a signal source in the HDL supply net portion of the design. If so, then embodiments may insert an electrical-to-real converter for the UPF supply network and for any real-valued components in the HDL supply net portion of the design. This is the scenario shown previously in FIG. 3, wherein electrical PMU 316 connects to inserted electrical-to-real converter 316. The instance will also be processed further on, as will be described.

At 524, the simulator may set up the digital network. For those instances that have an electrical representation supply receiver, as determined at 518, three separate operations may occur. At 526, embodiments may connect a real-valued supply contributor to the UPF supply net. At 528, embodiments may connect a real-valued supply to the real-valued HDL supply net. At 530, embodiments may connect a UPF supply net to the input port of the real-to-electrical converter. Instances having an electrical representation supply receiver may also be processed further on, as will be described.

Also during the digital network setup, for those instances that have an electrical supply contributor, as determined at 520, two separate operations may occur. At 532, embodiments may connect the output port of an electrical-to-real converter to the UPF supply net. At 534, embodiments may connect the output port of an electrical-to-real converter to the real-valued HDL supply net. Instances having an electrical representation supply contributor may also be processed further on, as will be described.

At 536, the simulator may set up the analog network. For those instances that have an electrical representation supply receiver, as determined at 518, embodiments may connect the output port of a real-to-electrical converter to the electrical represented HDL supply net at 538. At 540, for those instances that have an electrical supply contributor, as determined at 520, embodiments may connect the electrical supply contributor to the electrical HDL supply net.

Figure 6:
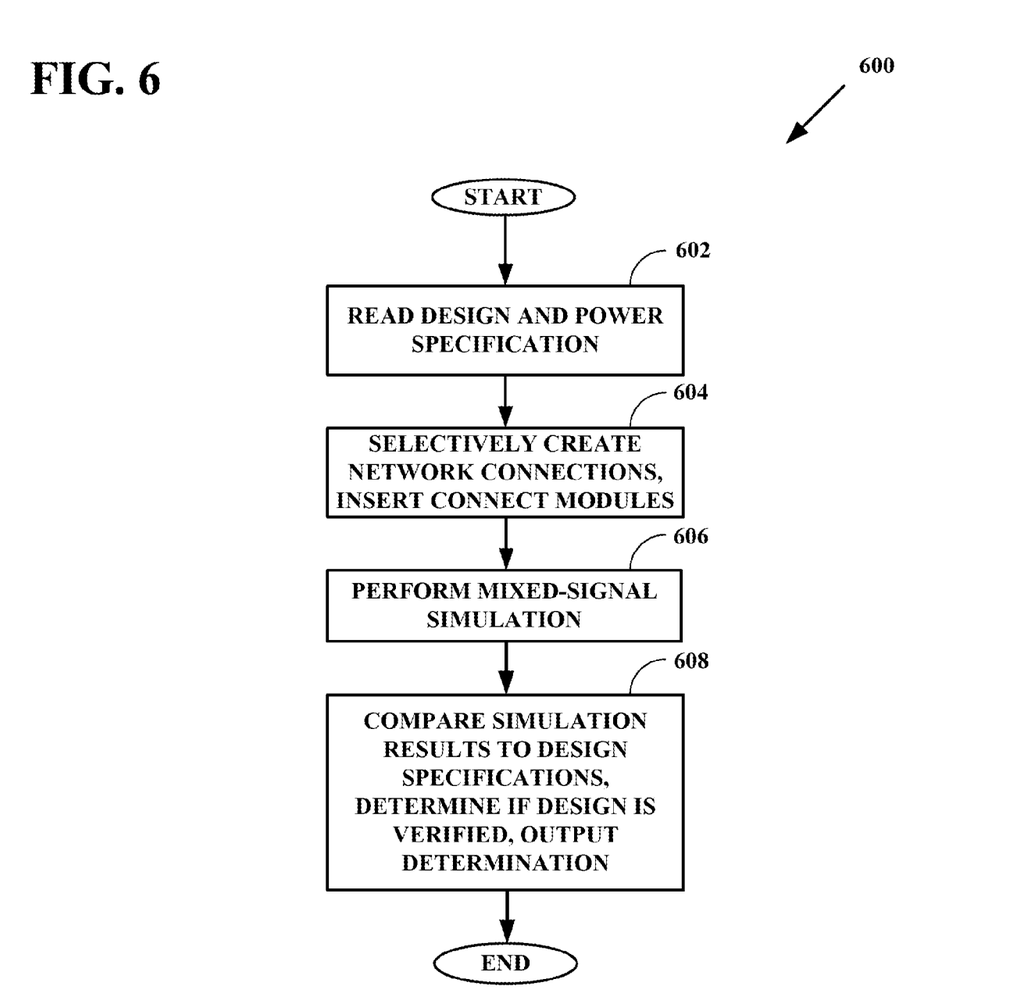
FIG. 6 is a flowchart of a power-aware mixed-signal verification methodology 600, according to an embodiment.

FIG. 6 shows a flowchart of a power-aware mixed-signal verification methodology 600, according to an embodiment. The different aspects of the overall methodology are now described in more detail in terms of particular exemplary and non-limiting operations in this figure. A first major aspect 602 of the overall methodology is to read the circuit design and the power specification, such as an exemplary UPF/IEEE1801 specification or other recognized power specification. A second major aspect 604 of the overall methodology is to selectively internally create a network connection and insert a corresponding connect module in the design, for at least one circuit block having an unsupported signal that is declared in the power specification. A third major aspect 606 of the overall methodology is to perform a mixed-signal simulation of the design, including the network connections and inserted connect modules. A fourth major aspect 608 of the overall methodology is to compare the simulated design performance results and the input design specifications to make a determination as to whether the design operation is verified. The simulator or a separate application may make the determination, which will be tangibly output to provide a manufacturable description of the circuit.

Figure 7:
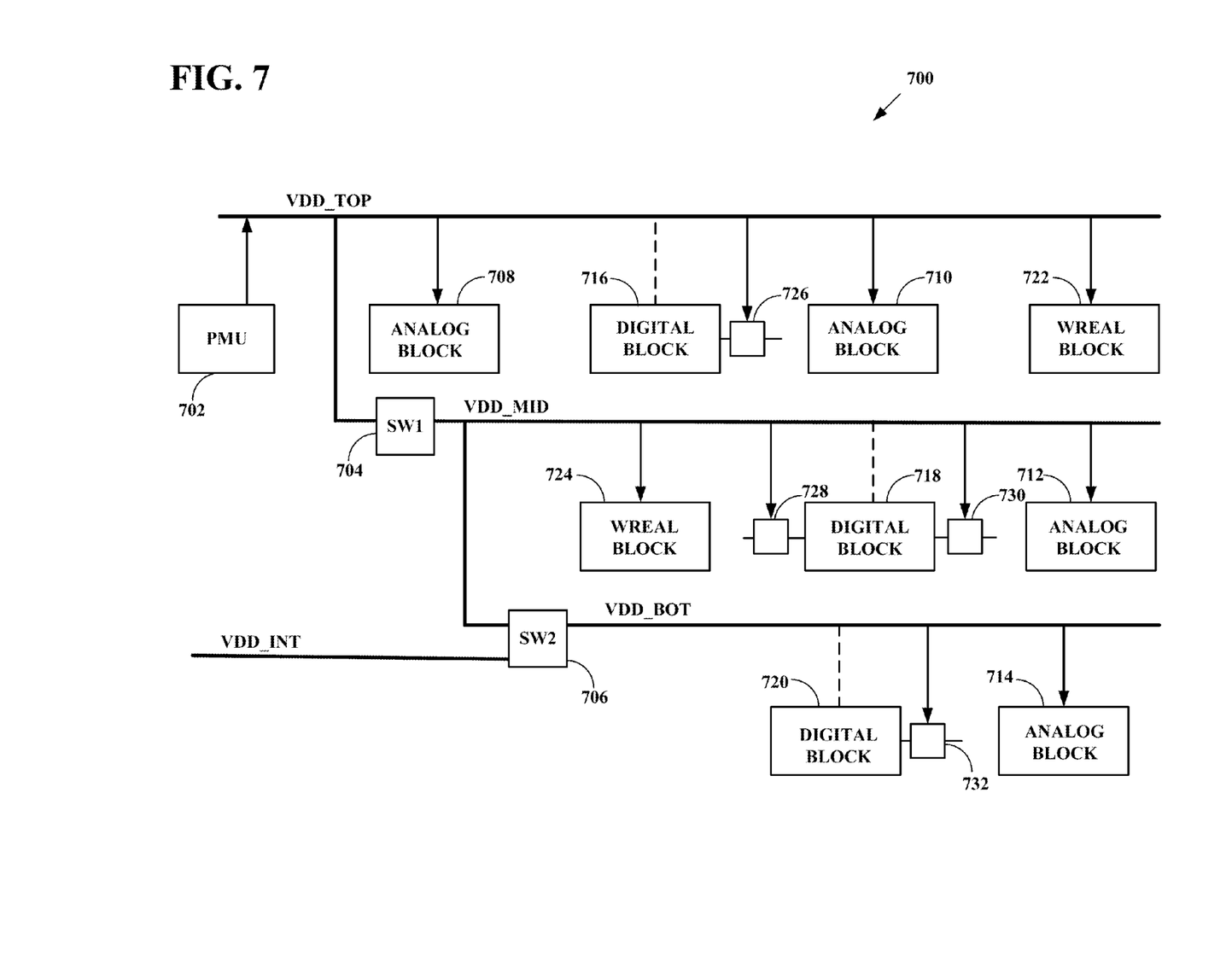
FIG. 7 is a diagram of a power-aware mixed-signal system 700, according to an embodiment.

FIG. 7 shows a diagram of a power-aware mixed-signal system 700, according to an embodiment. Power management unit 702 may provide supply voltage VDD_TOP to a UPF supply net for example. PMU 702 outputs voltage in an electrical representation in this example. Power switch 704 may output UPF supply voltage VDD_MID in response to control signals (not shown). Power switch 706 may output UPF supply voltages VDD_BOT and VDD_INT in response to control signals (not shown). The VDD_MID, VDD_BOT, and VDD_INT UPF supply voltages may each be derived from the VDD_TOP supply voltage.

Analog blocks 708, 710, 712, and 714 may all require supply voltages in an electrical representation. Analog blocks 708 and 710 are to be powered by the VDD_TOP voltage, while analog block 712 is to be powered by the VDD_MID voltage, and analog block 714 is to be powered by the VDD_BOT voltage.

Digital blocks 716, 718, and 720 may all require supply voltages in a logic (e.g., real) representation. Digital block 716 is to be powered by the VDD_TOP voltage, while digital block 718 is to be powered by the VDD_MID voltage, and digital block 720 is to be powered by the VDD_BOT voltage. Further, digital blocks 716, 718, and 720 may each produce outputs that may need to be converted for use by other blocks, e.g., analog blocks requiring electrical signal representations. Digital block 718 may have an input that may need to be converted from other blocks, e.g., wreal blocks providing real representations. Conversion may encompass level-shifting and/or changes in representation type. Connect modules 726, 728, 730, and 732 are shown for these blocks.

Wreal blocks 722 and 724 may require supply voltages in a wreal representation. Wreal block 722 is to be powered by the VDD_TOP voltage while wreal block 724 is to be powered by the VDD_MID voltage.

As described by FIG. 5, embodiments may search through the design for component instances that have real-valued supply contributors, electrical supply contributors, and electrical supply receivers. Embodiments may then selectively create internal network connections and insert real-to-electrical and electrical-to-real converters as shown and described in the next figure.

Figure 8:
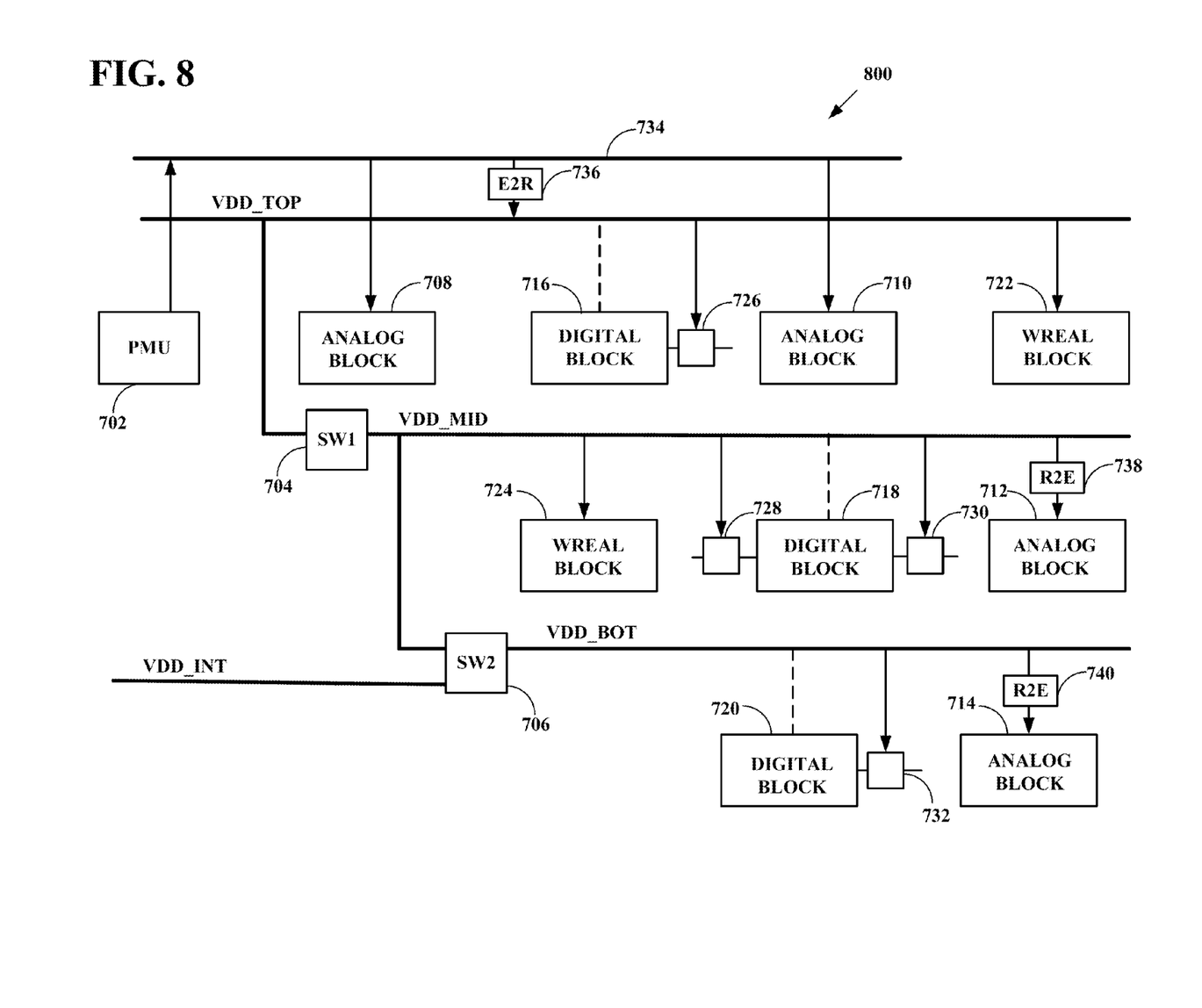
FIG. 8 is a diagram of a power-aware mixed-signal system 800, according to an embodiment.

FIG. 8 shows a diagram of a power-aware mixed-signal system 800, according to an embodiment. This figure is identical to FIG. 7 except for modifications to be described. First, as described in FIG. 5 item 512, connect modules may be inserted. As described in FIG. 5 item 516, the embodiments may insert real-to-electrical converters for the HDL electrical supply net. In this case, analog blocks 712 and 714 need voltages VDD_MID and VDD_BOT respectively in electrical representations. Therefore, the embodiments may insert real-to-electrical converters 738 and 740.

Next, as described in FIG. 5 item 520, the embodiments may insert electrical-to-real converters for the UPF supply net and for the real-valued HDL supply net. In this case, embodiments may insert electrical-to-real converter 736 to convert the electrical output from PMU 702 (which will be put onto new supply net 734 to be described) to provide voltage VDD_TOP.

Next, as described in FIG. 5 item 524, embodiments may proceed to digital network setup. As described in FIG. 5 item 530, embodiments may connect the UPF supply net to the input port of inserted real-to-electrical converters. In this case, embodiments may connect VDD_MID and VDD_BOT to the input ports of real-to-electrical converters 738 and 740, respectively. As described in FIG. 5 item 532, embodiments may connect the output port of electrical-to-real connector 736 to the exemplary UPF supply net.

Next, as described in FIG. 5 item 536, embodiments may proceed to analog network setup. As described in FIG. 5 item 538, embodiments may connect the output ports of inserted real-to-electrical converters to the electrical HDL supply nets. In this case, embodiments may connect real-to-electrical converters 738 and 740 to analog blocks 712 and 714, respectively, to deliver VDD_MID and VDD_BOT, respectively, in electrical representations. As described in FIG. 5 item 540, embodiments may connect electrical supply contributor PMU 702 to an HDL electrical supply net 734. PMU 702 may supply analog blocks 708 and 710 directly via HDL electrical supply net 734.

Figure 9A:
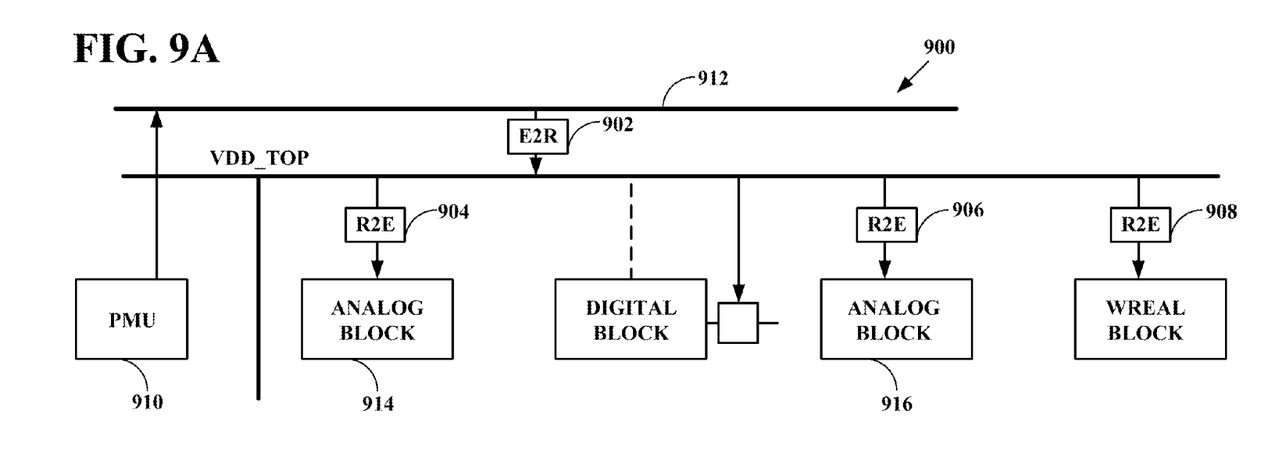
FIGS. 9A and 9B are diagrams of a power-aware mixed-signal system 900 and a condensed power-aware mixed-signal system 950, according to an embodiment.
Figure 9B:
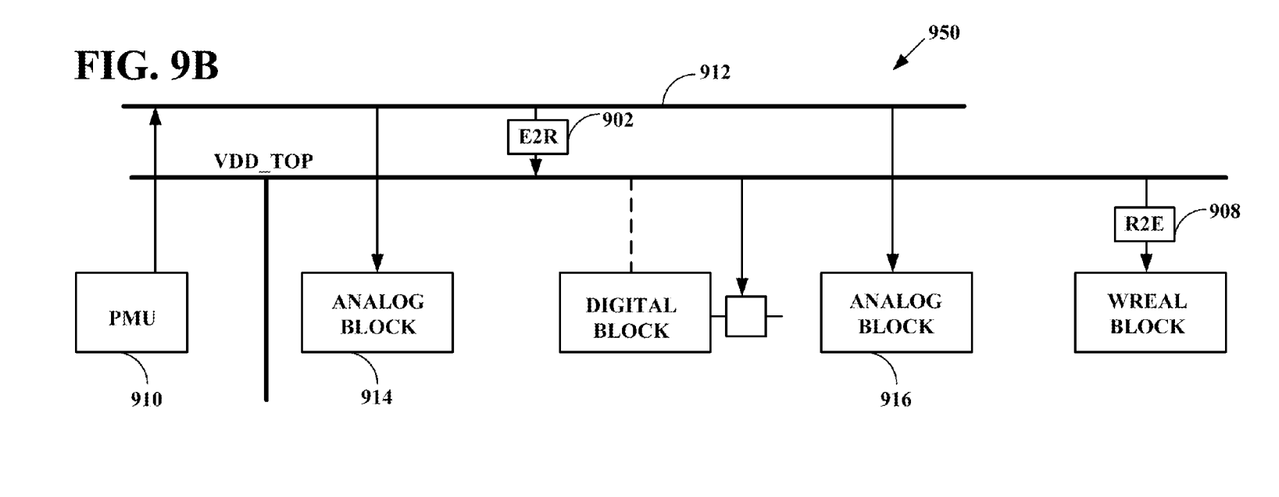

FIGS. 9A and 9B show diagrams of a power-aware mixed-signal system 900 and a condensed power-aware mixed-signal system 950, according to an embodiment. In FIG. 9A, four converters 902, 904, 906, and 908 of various types may have been inserted as a result of converting an input design into a power-aware input design for power-aware mixed-signal simulation and verification. The insertion may have been performed by an application or manually. Some of these converters may be redundant, or may be made redundant via reconnection to different available supply nets. In this case, a UPF supply net may provide VDD_TOP, while a PMU 910 may provide an output signal to a separate supply net 912.

Embodiments may condense converters 904 and 906 via de-insertion and reconnection of analog blocks 914 and 916 to supply net 912 as shown in FIG. 9B. PMU 910 may thus supply blocks 914 and 916 via supply net 912. Further consolidation may be carried out by embodiments so that overall simulation and verification efficiency may be improved.

The described exemplary and non-limiting embodiments may advance the art of circuit design and manufacturing in several ways. First, from the design point of view, design nets with different types and/or disciplines (e.g. electrical, wreal, etc.) may directly connect, and achieve the expected behavior as per the designer's intention. Further, since analog supply nets may be naturally connected to the exemplary IEEE1801 supply net, analog supply values may be passed to the IEEE1801 supply net. This feature may provide the corresponding connect modules with the more dynamic supply values originated from the analog supply net. The dynamic changes are also reflected on the digital-to-analog boundary, enabling more accurate simulation than is available with use of a discrete value power supply.

In addition, with the availability of the embodiments there is no need to use a specific supply_net_type instruction to make a design net to IEEE1801 supply net connection. Therefore, there is no need to manually create a converter for an unsupported net type, nor any need to manually insert a converter at all. The embodiments enable an intuitive use model by handling signal representation issues without requiring manual intervention.

Figure 10:
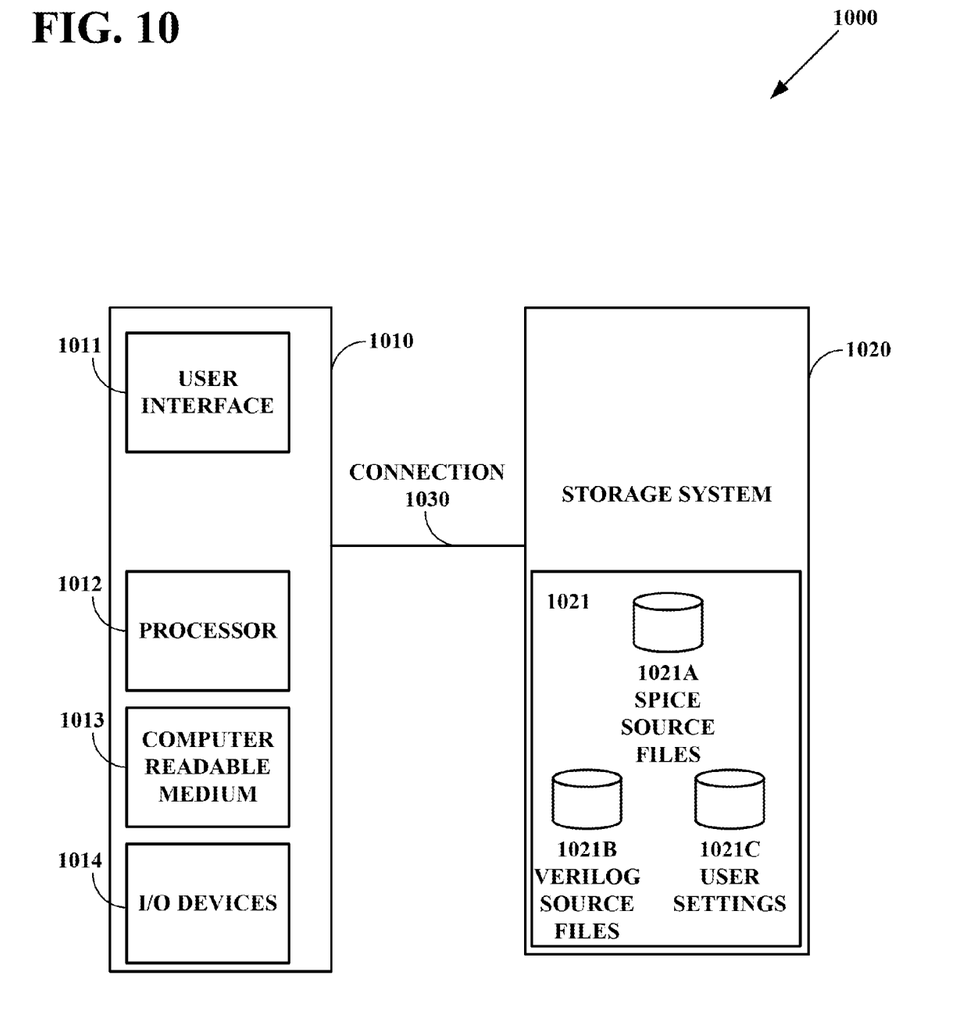
FIG. 10 is a block diagram of a circuit analysis system 1000, according to an embodiment.

FIG. 10 shows a block diagram of an exemplary circuit analysis system 1000, according to an embodiment. This system may provide simulator functionality for any of the methods described above. A user may access the system 1000 through a standalone client system, client-server environment, or a network environment. System 1000 may comprise one or more clients or servers 1010, one or more storage systems 1020, and a connection or connections 1030 between and among these elements.

Client 1010 may execute instructions stored on transitory or non-transitory computer readable medium 1013 with processor 1012, and may provide a user interface 1011 to allow a user to access storage system 1020. The instructions may be part of a software program or executable file that may operate electronic design automation software. Client 1010 may be any computing system, such as a personal computer, workstation, mobile computer, or other device employing a processor which is able to execute programming instructions. User interface 1011 may be a graphical user interface (GUI) run in a user-controlled application window on a display. A user may interact with user interface 1011 through one or more input/output (I/O) devices 1014 such as a keyboard, a mouse, or a touch screen.

Storage system 1020 may take any number of forms, including but not limited to a server with one or more storage devices attached to it, a storage area network, or one or a plurality of non-transitory computer readable media. Databases 1021 may be stored in storage system 1020 such that they may be persistent, retrieved, or edited by the user. Databases 1021 may include SPICE source files 1021A, Verilog source files 1021B, and a user input database 1021C for example. These databases may be kept as separate files or systems, or may be merged together in any appropriate combination.

Only one client 1010 is shown connected to storage system 1020 through connection 1030, which may be a simple direct wired or wireless connection, a system bus, a network connection, or the like, to provide client 1010 with access to storage system 1020. In another aspect, connection 1030 may enable multiple clients 1010 to connect to storage system 1020. The connection may be part of a local area network, a wide area network, or another type of network, again providing one or more clients with access to storage system 1020. Depending on system administrator settings, client 1010's access to system storage 1020 or to other clients may be limited.

Figure 11:
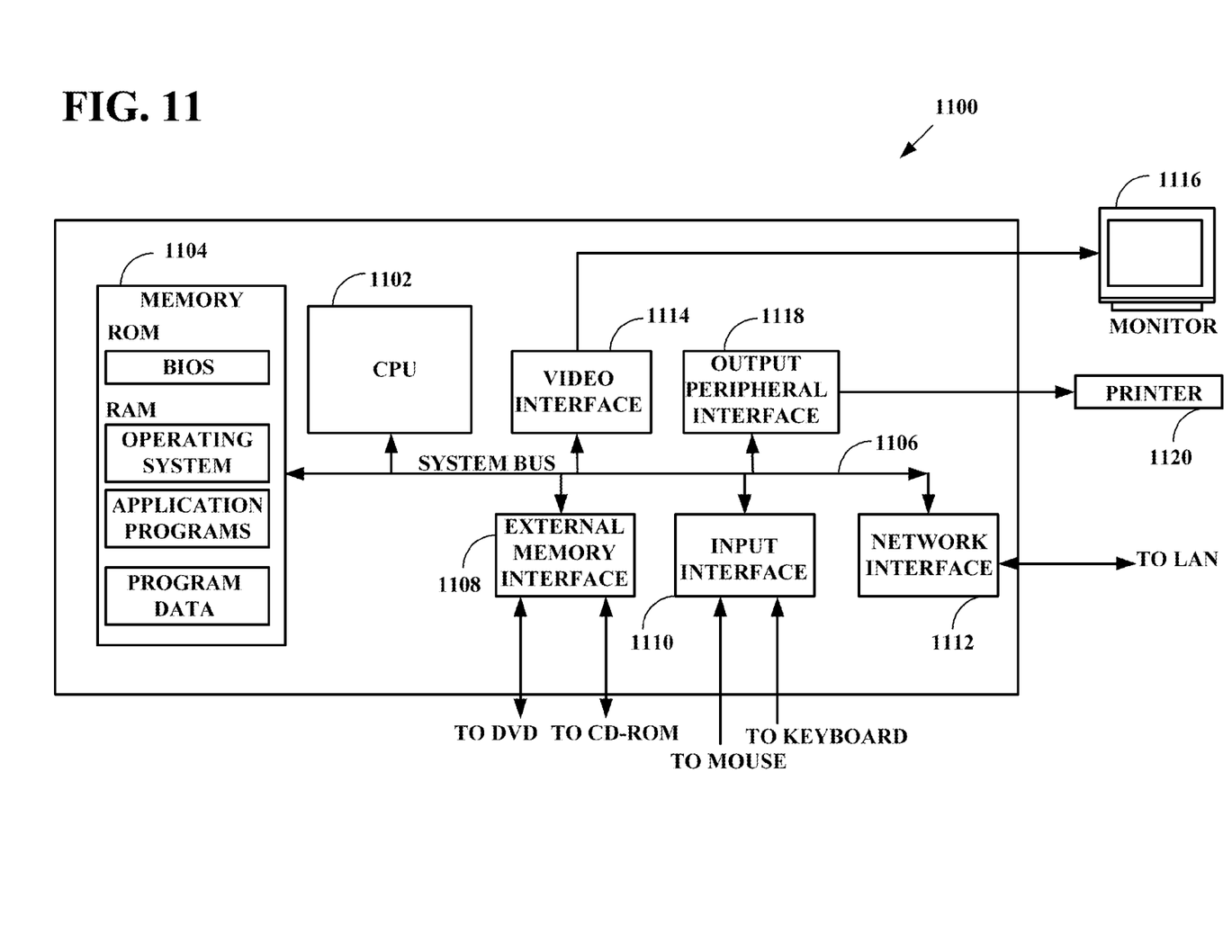
FIG. 11 is a diagram of a computer system 1100, according to an embodiment.

FIG. 11 depicts an exemplary computer system comprising the structure for implementation of embodiments described above. Computer system 1100 comprises a central processing unit (CPU) 1102 that processes data stored in memory 1104 exchanged via system bus 1106. Memory 1104 typically includes read-only memory, such as a built-in operating system, and random-access memory, which may include an operating system, application programs, and program data. Computer system 1100 also comprises an external memory interface 1108 to exchange data with a DVD or CD-ROM for example. Further, input interface 1110 may serve to receive input from user input devices including but not limited to a keyboard and a mouse. Network interface 1112 may allow external data exchange with a local area network (LAN) or other network, including the internet. Computer system 1100 also typically comprises a video interface 1114 for displaying information to a user via a monitor 1116. An output peripheral interface 1118 may output computational results and other information to output devices including but not limited to a printer 1120.

Computer system 1100 may comprise for example a personal computer or an engineering workstation, each of which is widely known in the art and is commonly used for integrated circuit design tasks, along with software products commercially available for performing computer-aided integrated circuit design tasks. Computer system 1100 may also comprise a mobile computer, including for example a tablet computer or a smart phone. The computer system of FIG. 11 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" means one or more than one. The term "plurality" means two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A system for determining whether a design for a circuit meets design specifications, so as to facilitate the provision of a manufacturable description of the circuit, the system comprising:
   a computer comprising a processor and a memory; and
   a computer-operated circuit simulation tool that:
      reads the design for the circuit and a power specification;
      identifies a signal between an analog circuit block and a digital circuit block in the design that is unsupported by the power specification;
      selectively internally creates a network connection and inserts a corresponding connect module between the analog circuit block and the digital circuit block based on the power specification;
      performs a mixed-signal simulation of the design; and
      tangibly outputs a verification determination from a comparison of the simulated design performance results and the design specifications in order to provide the manufacturable description of the circuit.

2. The system of claim 1 wherein the power specification comprises a standardized power specification format.

3. The system of claim 1 wherein the design comprises at least one circuit block configured to receive an analog signal.

4. The system of claim 3 wherein the at least one circuit block is one of (i) originally provided to receive the analog signal and (ii) originally provided to receive a digital signal but is replaced with a circuit block that is configured to receive the analog signal.

5. The system of claim 3 wherein the analog signal comprises an electrical voltage.

6. The system of claim 1 wherein the connect module comprises one of an analog-to-digital connect module and a digital-to-analog connect module.

7. The system of claim 1 wherein the circuit simulation tool further collapses the network connections and the inserted corresponding internal connect modules.

8. A hardware-implemented method for determining whether a design for a circuit meets design specifications, so as to facilitate the provision of a manufacturable description of the circuit, the method comprising:
   using a computer-operated circuit simulation tool:
      reading the design for the circuit and a power specification;
      identifying a signal between an analog circuit block and a digital circuit block in the design that is unsupported by the power specification;
      selectively internally creating a network connection and inserting a corresponding connect module between the analog circuit block and the digital circuit block based on the power specification; and
      performing a mixed-signal simulation of the design; and
      tangibly outputting a verification determination from a comparison of the simulated design performance results and the design specifications in order to provide the manufacturable description of the circuit.

9. The method of claim 8 wherein the power specification comprises a standardized power specification format.

10. The method of claim 8 wherein the design comprises at least one circuit block configured to receive an analog signal.

11. The method of claim 10 wherein the at least one circuit block is one of (i) originally provided to receive the analog signal and (ii) originally provided to receive a digital signal but is replaced with a circuit block that is configured to receive the analog signal.

12. The method of claim 10 wherein the analog signal comprises an electrical voltage.

13. The method of claim 8 wherein the connect module comprises one of an analog-to-digital connect module and a digital-to-analog connect module.

14. The method of claim 8 wherein the circuit simulation tool further collapses the network connections and the inserted corresponding internal connect modules.

15. A non-transitory computer readable medium storing instructions that, when executed by a processor, perform a method for determining whether a design for a circuit meets design specifications, so as to facilitate the provision of a manufacturable description of the circuit, the processor-implemented method comprising:
   using a computer-operated circuit simulation tool:
      reading the design for the circuit and a power specification;
      identifying a signal between an analog circuit block and a digital circuit block in the design that is unsupported by the power specification;
      selectively internally creating a network connection and inserting a corresponding connect module between the analog circuit block and the digital circuit block based on the power specification; and
      performing a mixed-signal simulation of the design; and
      tangibly outputting a verification determination from a comparison of the simulated design performance results and the design specifications in order to provide the manufacturable description of the circuit.

16. The medium of claim 15 wherein the power specification comprises a standardized power specification format.

17. The medium of claim 15 wherein the design comprises at least one circuit block configured to receive an analog signal.

18. The medium of claim 17 wherein the analog signal comprises an electrical voltage.

19. The medium of claim 15 wherein the connect module comprises one of an analog-to-digital connect module and a digital-to-analog connect module.

20. The medium of claim 15 wherein the circuit simulation tool further collapses the network connections and the inserted corresponding internal connect modules.

* * * * *